US009105405B2

(12) United States Patent
Masuda et al.

(10) Patent No.: US 9,105,405 B2
(45) Date of Patent: Aug. 11, 2015

(54) CERAMIC ELECTRONIC COMPONENT WITH METAL TERMINALS

(71) Applicant: TDK Corporation, Minato-ku, Tokyo (JP)

(72) Inventors: Sunao Masuda, Tokyo (JP); Katsumi Kobayashi, Tokyo (JP); Takashi Komatsu, Nikaho (JP); Akitoshi Yoshii, Tokyo (JP); Kazuyuki Hasebe, Nikaho (JP); Kayou Kusano, Nikaho (JP); Norihisa Ando, Tokyo (JP)

(73) Assignee: TDK CORPORATION, Tokyo (JP)

( * ) Notice: Subject to any disclaimer, the term of this patent is extended or adjusted under 35 U.S.C. 154(b) by 116 days.

(21) Appl. No.: 14/024,398

(22) Filed: Sep. 11, 2013

(65) Prior Publication Data

US 2014/0118882 A1    May 1, 2014

(30) Foreign Application Priority Data

Sep. 28, 2012  (JP) ................. 2012-217285
Jun. 27, 2013  (JP) ................. 2013-135436

(51) Int. Cl.
| H01G 4/228 | (2006.01) |
| H01G 2/06 | (2006.01) |
| H01G 4/30 | (2006.01) |
| H01G 4/232 | (2006.01) |
| H01G 4/12 | (2006.01) |

(52) U.S. Cl.
CPC ............ *H01G 2/06* (2013.01); *H01G 4/232* (2013.01); *H01G 4/2325* (2013.01); *H01G 4/30* (2013.01); *H01G 4/12* (2013.01)

(58) Field of Classification Search
USPC ............ 361/306.3, 301.2–301.4, 303–305, 361/306.1, 309–313, 321.1–321.2
See application file for complete search history.

(56) References Cited

U.S. PATENT DOCUMENTS

| 4,785,990 | A | * | 11/1988 | Nakahara et al. ............. 228/170 |
| 5,963,423 | A | * | 10/1999 | Ikeda ............................. 361/690 |
| 6,310,758 | B1 | * | 10/2001 | Niikura ......................... 361/309 |
| 6,515,844 | B1 | * | 2/2003 | Moriwaki et al. .......... 361/306.1 |
| 7,333,318 | B2 | * | 2/2008 | Hidaka et al. .............. 361/306.1 |
| 7,839,621 | B2 | * | 11/2010 | Shirakawa et al. ........ 361/306.1 |

FOREIGN PATENT DOCUMENTS

| JP | 11-040460 A | 2/1999 |
| JP | 2006-080231 A | 3/2006 |
| JP | 2012-094785 A | 5/2012 |

* cited by examiner

*Primary Examiner* — Nguyen T Ha
(74) *Attorney, Agent, or Firm* — Arent Fox LLP

(57) ABSTRACT

A ceramic electronic component with metal terminals comprising a chip component formed with terminal electrodes at both ends, and a pair of metal terminals comprising a flat plate portion having a flat plate portion facing face provided so that it faces an end face of said chip component and connected to said terminal electrodes via a joining portion, and a mounting portion connected to one end portion of said flat plate portion and extending approximately perpendicular to said flat plate portion, wherein said mounting portion has a mounting portion bottom face forming an angle of approximately 270 degrees with respect to said flat plate portion, and a mounting portion upper face forming an angle of approximately 90 degrees with respect to said flat plate portion, and a solder adhering prevention area having lower wettability than said mounting portion bottom face is formed.

12 Claims, 15 Drawing Sheets

CERAMIC ELECTRONIC COMPONENT WITH METAL TERMINALS

BACKGROUND OF THE INVENTION

1. Field of the Invention

The present invention relates to a ceramic electronic component comprising a chip component and metal terminals attached thereto.

2. Background Art

As the ceramic electronic component such as the ceramic capacitor or so, besides the usual chip component which is surface mounted directly to the board or so independently, the chip component having metal terminals is also proposed. The ceramic electronic components having the metal terminals relieves the deformation stress to the chip component from the board, and the effect of protecting the chip component from the impact or so is also reported, thus it is used in the field which is demanded to have the durability and the reliability (refer to Patent article 1).

Also, the ceramic electronic component using the metal terminals is attached to the mounting board using the solder or so. The amount of the solder used when attaching the mounting board to the ceramic electronic component is regulated and controlled in many cases from the point of securely fixing the ceramic electronic component to the mounting board and securing the electrical conductivity, thus in some cases the excessive solder adheres to near the mounting portion.

PRIOR ART ARTICLES

[Patent article 1] JP Patent application laid open No. H11-40460

SUMMARY OF THE INVENTION

The Problem to be Solved by the Invention

The ceramic electronic component with the metal terminals according to the conventional technologies had a problem of the squealing noise when using it due to the influence from the electric strain caused to the electronic component. The inventors according to the present invention has found that the squealing noise of the ceramic electronic component with the metal terminals is related to the adhered condition of the solder which bonds said ceramic electronic component to the mounting board, thereby found the present invention.

The present invention has been achieved in view of such situation, and the object is to provide the ceramic electronic component with the metal terminals capable of preventing the squealing noise during its use.

Means for Solving the Problems

In order to accomplish the above mentioned object, the ceramic electronic component according to the present invention comprises a chip component formed with terminal electrodes at both ends, and a pair of metal terminals comprising a flat plate portion having a flat plate portion facing face provided so that it faces an end face of said chip component and connected to said terminal electrodes via a joining portion, and a mounting portion connected to one end portion of said flat plate portion and extending approximately perpendicular to said flat plate portion, wherein said mounting portion has a mounting portion bottom face forming an angle of approximately 270 degrees with respect to said flat plate portion, and a mounting portion upper face forming an angle of approximately 90 degrees with respect to said flat plate portion, and a solder adhering prevention area having lower wettability than said mounting portion bottom face is formed.

The ceramic electronic component according to the present invention is formed with the solder adhering prevention area at the mounting portion upper face, thus the solder used for mounting the ceramic electronic component to the board can be prevented from excessively adhering to the mounting portion upper face. Thereby, the ceramic electronic component according to the present invention prevents the vibration which is generated at the chip component by the solder used for mounting the ceramic electronic component to board being excessively adhering to the part other than the mounting portion bottom face from easily transferred to the mounting board. Thereby, the squealing noise caused by the vibration generated at the chip component being transferred to the mounting board can be effectively suppressed.

Also, said solder adhering prevention area may be formed at a first part of said flat plate portion facing face.

By forming the solder adhering prevention area not only to the mounting portion upper face but also at a part of the flat plate portion facing face, excessive adhering to the part other than the mounting portion bottom face, and the squealing noise can be further effectively prevented.

Also, for example, said metal terminals comprises the substrate and a coating layer coating at least part the substrate surface which is the surface of the substrate, and at said solder adhering prevention area, said substrate surface may be exposed.

As for the method for forming the solder adhering prevention area, it is preferable that the metal terminals may be constituted by the substrate and the coating layer, and at least the solder adhering prevention area is in a condition without the coating layer. Thereby, the joining strength between the mounting portion bottom face and the solder is suitably secured, while the excessive adhering of the solder to the solder adhering prevention area can be prevented. Also, such method is advantageous from the point of reducing the process load, and improving the forming accuracy.

Also, for example, said substrate may include at least one element selected from the group consisting of Ni, Cu, Sn, Fe, Zn, Al, Cr, and said coating layer may include at least one element selected from the group consisting of Sn, Ni, Cu.

By constituting the substrate by single metal or alloy including the above mentioned metal elements, and constituting the coating layer by single metal or alloy including the above mentioned metal elements, the joining strength between the mounting portion bottom face and the solder is suitably secured, while the excessive adhering of the solder to the solder adhering prevention area can be prevented.

Also, for example, said mounting face bottom face may be connected to said flat plate portion facing face.

By forming the mounting portion being bent to the opposite direction of chip component direct bottom with respect to the flat plate portion so that said mounting portion bottom face connects with the flat plate facing face of the chip component, the solder is securely prevented from embedded in the space between the chip component and the mounting portion upper face, thus the squealing noise can be prevented.

A solder adhering area having higher wettability than said solder adhering prevention area may be formed at a second part of said flat plate portion facing face, said joining portion constituted by the solder may be electrically and physically connected with said second part and said terminal electrodes.

In regards with the form of the joining portion which bonds the chip component and the metal terminal, the joining portion may be constituted by the solder. In this case, the solder adhering area is formed at the flat plate facing face, to form an embodiment wherein the joining portion connects the solder adhering area and said terminal electrodes, thereby the joining strength between the chip component and the metal terminal can be enhanced.

Also, the joining portion which joins the chip component and the metal terminal may comprise at least a pair of fitting arm portion which holds the terminal electrodes of the chip component in between.

In case the arm portion comprises the joining portion, the metal terminal and the chip component can be assembled easily, thus such ceramic electronic component with the metal terminals is easy to produce. Also, in such ceramic electronic component, the fitting arm portion holds the terminal electrodes of the chip component, thereby the metal terminal and the chip component is fixed, hence fixing of the metal terminal portion and the chip component can be prevented from coming off due to the heat transferred to the joining portion when mounting said mounting ceramic electronic component.

In order to accomplish the above object, the ceramic electronic component according to the second aspect of the present invention comprises a chip component formed with terminal electrodes at both ends, and a pair of metal terminals has a flat plate portion having a flat plate portion facing face provided so that it faces an end face of said chip component and connected to said terminal electrodes via a joining portion, and a mounting portion connected to one end portion of said flat plate portion and extending approximately perpendicular to said flat plate portion, wherein said mounting portion comprises a mounting portion bottom face forming an angle of approximately 270 degrees with respect to said flat plate portion, and a mounting portion upper face forming an angle of approximately 90 degrees with respect to said flat plate portion, and a solder adhering prevention area having lower wettability than said mounting portion bottom face is formed at said flat plate portion.

As the ceramic electronic component according to the second aspect of the present invention, the solder adhering prevention area is formed at the flat plate portion, and the solder used when mounting the ceramic electronic component to the board can be prevented from excessively adhering to the flat plate portion of the metal terminals. Thereby, the ceramic electronic component according to the present invention prevents the vibration generated at the chip component from easily transferring to the mounting board caused by the solder for mounting the ceramic electronic component to the board excessively adhering to the part other than the mounting portion bottom face. Thereby the squealing noise caused by the vibration generated at the chip component transferring to the mounting board can be effectively suppressed.

Also, for example, said solder adhering prevention area has an inner side prevention area formed in at least part of between said one end portion of and the connection position with said chip component on said flat plate facing face.

By the solder adhering prevention are having the inner side prevention area, the squealing noise caused by the solder used when mounting the ceramic electronic component to the board being connected to the chip component can be effectively prevented from worsening.

Also, for example said solder adhering prevention area may be formed by taking a space of 0.05 to 0.5 mm from said one end portion.

By forming the solder adhering prevention area taking a predetermined space from one end portion which is the connection portion with the mounting portion; thereby even in case the amount of the solder used for mounting the ceramic electronic component to the board is more than the usual amount due to the production variance or so, the squealing noise can be effectively prevented. This is because, in such ceramic electronic component, the solder is adhered and held at the mounting portion side than the solder adhering prevention area; hence the problem that the solder used when mounting the ceramic electronic component to the board connecting to the chip component by crossing over the solder adhering prevention area can be effectively prevented.

Also, for example, said mounting portion upper face and said flat plate portion facing face may form an angle of approximately 90 degrees.

Even if the distance of the mounting portion and the chip component is close, by forming the solder adhering prevention at the flat plate portion, the solder can be prevented from connecting to the chip component; hence such ceramic electronic component with the metal terminals can accomplish both the squealing noise prevention and the mounting area reduction.

Also, for example, said chip component may be a multi-layer ceramic capacitor.

By forming the solder adhering prevention are at the flat plate portion, the vibration generated at the chip component can be prevented from transferring to the mounting board; hence even if the multilayered ceramic capacitor which easily causes the vibration is used as the chip component, the squealing noise can be effectively suppressed.

THE EMBODIMENTS OF THE PRESENT INVENTION

The First Embodiment

Figure 1:
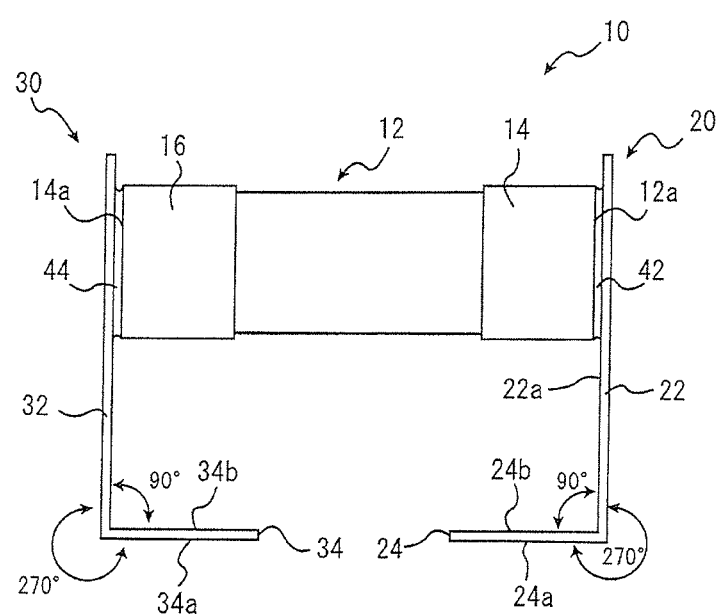
FIG. 1 is a schematic front view showing the ceramic electronic component according to the first embodiment of the present invention.

FIG. 1 is a schematic front view showing the ceramic capacitor 10 according to the first embodiment of the present invention. The ceramic capacitor 10 comprises the chip capacitor 12 as the chip component, a pair of the metal terminal portions 20, 30 connected with the ceramic capacitor 10 via the joining portions 42, 44. Note that, for the description of each embodiment, the ceramic capacitor attached with the metal terminal portions 20, 30 to the chip capacitor 12 will be used as an example to explain, however the ceramic electronic component of the present invention is not limited thereto, and the metal terminal portions 20, 30 may be attached to the chip component other than the capacitor.

Figure 3:
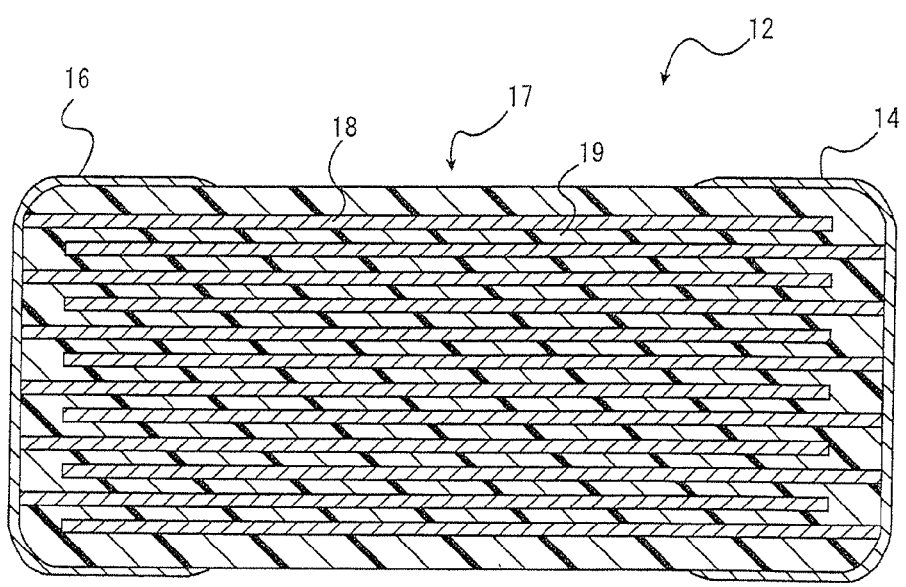
FIG. 3 is a schematic cross section showing the inner structure of the chip component included in the ceramic electronic component shown in FIG. 1.

FIG. 3 is a cross section of the chip capacitor 12 included in the ceramic capacitor 10, and the inner structure of the chip capacitor 12 is schematically shown. The chip capacitor 12 comprises the capacitor element 17, a pair of the terminal electrodes 14, 16 constituted by the first terminal electrode 14 and the second terminal electrode 16. The capacitor element 17 comprises the dielectric layer 19 as the ceramic layer, and the internal electrode layer 18, and the dielectric layer 19 and the internal electrode layer 18 are stacked in an alternating manner.

The material of the dielectric layer is not particularly limited, and for example it is constituted by the dielectric material such as calcium titanate, strontium titanate, barium titanate or the mixture thereof. The thickness of each dielectric layer 19 is not particularly limited; however in general it is several μm to several hundred μm. In the present embodiment, it is preferably 1.0 to 5.0 μm.

The conductive material included in the internal electrode layer 18 is not particularly limited; however in case the constituting material of the dielectric layer 19 has the reduction resistance, a base metal which is relatively inexpensive can be used. As for the base metal, Ni or Ni alloy or so is preferable. As for Ni alloy, the alloy between Ni and one or more selected from Mn, Cr, Co, and Al is preferable; and the content of Ni in the alloy is preferably 95 wt % or more. Note that, in Ni or Ni alloy, 0.1 wt % or less or so of various trace components such as P or so may be included. Also, the internal electrode layer 18 may be formed by using the commercially available electrode paste. The thickness of the internal electrode layer 18 may be determined accordingly depending on the use.

The material of the terminal electrodes 14, 16 are not particularly limited, and usually copper or copper alloy, nickel or nickel alloy or so are used, however silver or alloy of silver and palladium or so can be used. The thickness of the terminal electrodes 14, 16 are not particularly limited however usually it is 10 to 50 μm or so. Note that, at the surface of the terminal electrodes 14, 16, the metal coating selected from at least one of the group consisting of Ni, Cu, Sn or so may be formed.

The shape or the size of the chip capacitor 12 may be determined accordingly depending on the purpose or the use. When the chip capacitor 12 is a rectangular parallelepiped shape, usually it is the length (0.6 to 5.6 mm, preferably 0.6 to 3.2 mm)×width (0.3 to 5.0 mm, preferably 0.3 to 1.6 mm)×thickness (0.1 to 1.9 mm, preferably 0.3 to 1.6 mm) or so.

Figure 2:
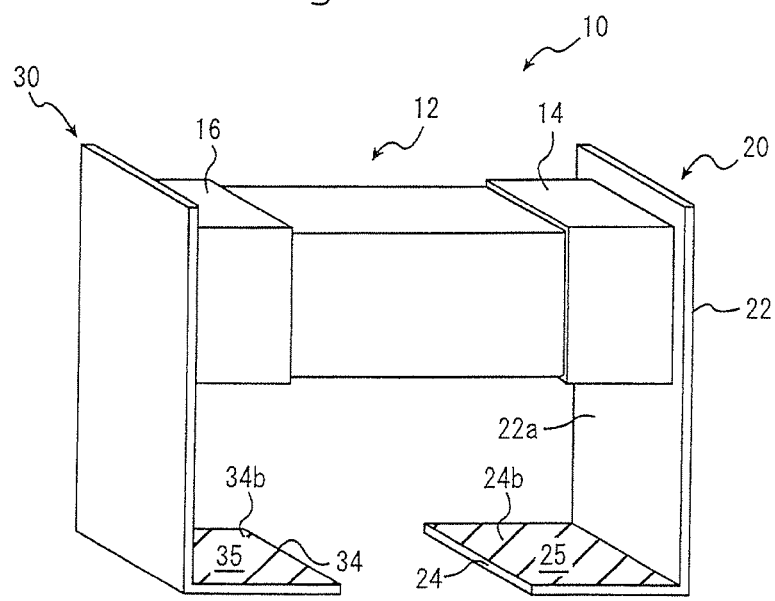
FIG. 2 is a schematic prospective view of the ceramic electronic component shown in FIG. 1.

As shown in FIG. 1 and FIG. 2, the metal terminal portions 20, 30 have a flat plate bended into a L shape. The first metal terminal portion 20 comprises the flat plate portion 22 having the flat plate portion facing face provided so that it faces with the end face 12a of the chip capacitor 12, and the mounting portion 24 which connects with and one end of the flat plate portion 22 and extends approximately perpendicular with respect to the flat plate portion 22. As shown in FIG. 1, the flat plate portion 22 is connected to the first terminal electrodes 14 of the chip capacitor 12 via the joining portion 42.

As shown in FIG. 1, the joining portion 42 is electrically and physically connected with the first terminal electrode 14 and the flat plate portion 22, and the material is not particularly limited, and for example, it is constituted by the solder or the conductive adhesive material or so. Also, in case the joining portion 42 is constituted by the solder, the element comprised in the solder is not particularly limited, however in order to prevent the joining portion 42 from melting when the ceramic capacitor 10 is soldered to the mounting board, the solder having relatively high melting temperature is preferably used as the solder constituting the joining portion 42.

The flat plate portion 22 of the first metal terminal portion 20 extends parallel to the end face 12a of the chip capacitor 12, while the mounting portion 24 of the first metal terminal portion 20 extends approximately parallel to the side face of the chip capacitor 12. That is, the first metal terminal portion 20 extends out from the flat plate portion 22, and comprises the mounting portion 24 which is bended into L shape towards the same side as the chip capacitor 12 with respect to the flat plate portion 22. The flat plate portion 24 comprises the mounting portion bottom face 24a forming an angle of approximately 270 degrees with respect to the flat plate portion 22, and the mounting portion upper face 24b forming approximately 90 degrees with respect to flat plate portion 22.

The mounting portion bottom face 24a is a face which faces to the mounting face of the mounting board when placing the ceramic capacitor 10 to the mounting board, and when the mounting board side is considered as the down side, it is a face which faces the down side in the ceramic capacitor 10. The solder used when mounting the ceramic capacitor 10 to the board, particularly connects the mounting portion bottom face 24a and the mounting face of the board, and fixes the ceramic capacitor 10 to the board, while securing the conductivity between the ceramic capacitor 10 and the board.

The mounting portion upper face 24b is a face opposite of the mounting portion bottom face 24a of the mounting portion 24, and when the mounting board side is considered as the down side, it is a face which is facing the upper side of the ceramic capacitor 10. As shown in FIG. 2, at the mounting portion upper face 24b, the solder adhering prevention area 25 having lower solder wettability than the mounting portion bottom face 24a is formed. The solder adhering prevention area 25 has lower solder wettability, hence the solder used when mounting the ceramic capacitor 10 to the board is difficult to adhere to the mounting portion upper face 24b where the solder adhering prevention area 25 is formed.

Figure 4:
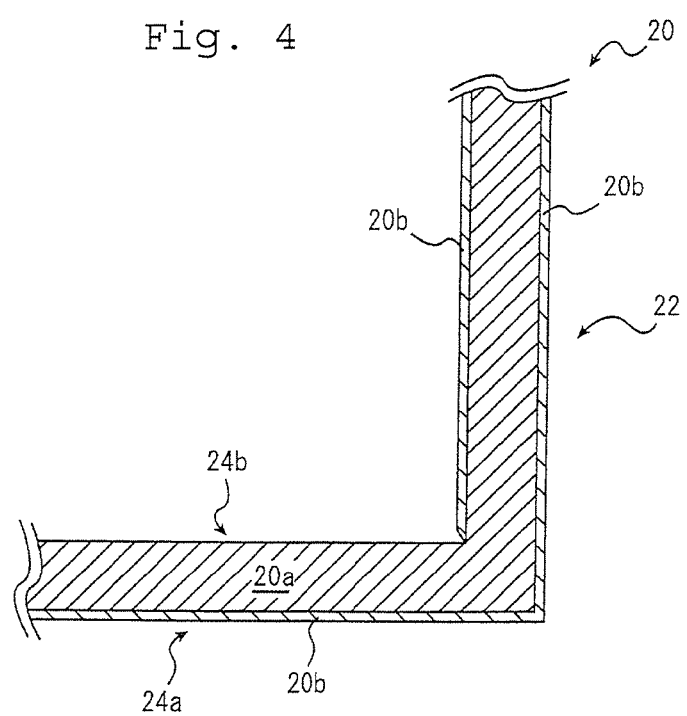
FIG. 4 is a schematic cross section showing the inner structure of the metal terminal portions included in the ceramic electronic component shown in FIG. 1.

FIG. 4 is an enlarged cross section showing the nearby area of the connection portion between the mounting portion 24 and the flat plate portion 22 of the first metal terminal portion 20. Although, the forming embodiment of the solder adhering prevention area 25 is not particularly limited, and for example due to the difference of the material between the substrate 20a and the coating layer 20b, the solder adhering prevention area 25 can be formed. The first metal terminal portion 20 according to the present embodiment comprises the substrate 20a and the coating layer 20b coating at least part of the substrate surface which is the surface of the substrate 20a. The coating layer 20b is constituted by a material having higher solder wettability than the substrate 20a, and the mounting portion upper face 24b where the coating layer 20b is not coated and the substrate surface is exposed (the solder adhering prevention area 25) has lower solder wettability than the mounting portion bottom face 24a where the coating layer 20b is coating the substrate 20a.

The constituting element of the substrate 20a of the first metal terminal portion 20 is not particularly limited, and for example it may be a single metal or alloy including at least one element selected from the group consisting of Ni, Cu, Sn, Fe, Zn, Al, Cr. Also, the constituting element of the coating layer 20b is not particularly limited as long as it is constituted so that the solder wettability is higher than the substrate 20a, and for example it may be a single metal or alloy including at least one element selected from the group consisting of Ni, Cu, Sn; and particularly preferably the main component is Sn.

Note that, in the example shown in FIG. 2 and FIG. 4, to the entire mounting portion upper face 24b, the solder forming prevention are 25 is formed, however the embodiment of the mounting portion upper face 24b is not limited thereto, and for example, the solder adhering prevention area 25 may be formed at the part of the mounting portion upper face 24b, and other part of the mounting portion upper face 24b may be coated by the coating layer 20b. Also, in the first metal terminal portion 20 shown in FIG. 4, the substrate surface except for the mounting portion upper face 24b is entirely coated by the coating layer 20b; however it is not limited thereto as described in the second and the third embodiment. Further, in regards with the embodiment of the solder adhering prevention area 25, it is not limited to the embodiment which exposes the substrate surface, and for example, the embodiment in which the mounting portion bottom face 24a is coated by the coating layer different from the coating layer 20b, or the embodiment of changing the surface roughness can be used.

As shown in FIG. 1, the second metal terminal portion 30 comprises the flat plate portion 32 facing the end face 12b of the chip capacitor 12, and the mounting portion 34 connecting with other end portion of the flat plate portion 32 and extending approximately perpendicular to the flat plate portion 32. Also, as shown in FIG. 2, at the mounting portion upper face 34b of the second metal terminal portion 30, the solder adhering prevention area 35 having lower wettability than the mounting portion bottom face 34a.

The second metal terminal portion 30 has the same constitution as the above mentioned first metal terminal portion 20 except for being placed symmetrically with respect to the first metal terminal portion 20; hence the detailed description will be omitted in here. Also, the joining portion 44 electrically and physically connecting the second terminal electrode 16 and the flat plate portion 32 (refer to FIG. 1) has the same constitution as the above mentioned joining portion 42.

Hereinafter, the production method of the ceramic capacitor 10 will be described.

The Production Method of the Chip Capacitor 12

First, in order to form the green sheet which becomes the dielectric layer 19 after the firing, the green sheet paste is prepared. The green sheet paste in the present embodiment is constituted by the water-based paste or the organic solvent paste obtained by kneading the raw material of the dielectric material and the organic vehicle.

As for the raw material of the dielectric material, various compounds which becomes calcium titanate, strontium titanate, barium titanate after firing may be used; for example it is accordingly selected from carbonates, nitrates, hydroxides, and organic metal compounds, and it may be used by mixing. As for the raw material of the dielectric material, for example those having the powder form with the average particular diameter of 0.2 to 0.5 µm or so can be used; however it is not particularly limited thereto.

The organic vehicle is the organic solvent dissolved with the binder resin. As for the binder resin used for the organic vehicle, it is not particularly limited, and various usual binder resins such as ethyl cellulose, polyvinyl butyral, acrylic resin or so can be exemplified.

Also, the organic solvent used for the organic vehicle is not particularly limited, and usual organic solvents such as alcohol, acetone, methylethyl ketone (MEK), toluene, xylene, ethyl acetate, butyl stearate, terpeniol, butyl carbitol, isobonylacetate or so can be exemplified. Note that, in case the green sheet paste is a water-based paste, for example polyvinyl alcohol which is water soluble can be used as the binder.

Also, in the green sheet paste, the additives selected from various dispersant, plasticizer, anti-static agent, dielectrics, glass frits, and insulator or so may be added depending on the needs.

Next, using the above mentioned green sheet paste; the green sheet was formed on the carrier sheet. The thickness of the green sheet is not particularly limited; however for example it is 2.0 to 7.0 µm or so. The green sheet is dried after formed on the carrier sheet.

Next, on the one surface of the green sheet, the electrode pattern is formed which will become the internal electrode layer 18 after firing. As the method for forming the electrode pattern, it is not particularly limited; however, a printing method, a transfer method, a thin film method or so can be mentioned as examples. After forming the electrode pattern on the green sheet, the green sheet formed with the electrode pattern is obtained by drying.

The internal electrode layer paste is prepared by kneading the conductive material comprising various conductive metals or the alloy or so, various oxides which becomes the above mentioned conductive material by firing, the organic metal compound, resinate or so, and the organic vehicle.

As the conductive material used for producing the internal electrode layer paste, Ni or Ni alloy, and the mixture thereof are preferably used. The shape of such conductive material is not particularly limited, and it may be spherical shape, scale shape or so; also these shapes may be mixed as well.

The organic vehicle comprises the binder resin and the organic solvent as similar to the green sheet paste. As for the binder resin, for example, ethyl cellulose, acrylic resin, polyvinyl butyral, polyvinyl acetal, polyvinyl alcohol, polyolefin, polyurethane, polystyrene or so, and the copolymers thereof or so may be exemplified.

Also, as the solvent, for example, terpineol, butylcarbitol, kerosene or so which are known can be used. In the internal electrode layer paste, the additives selected from various dispersants, plasticizers, anti-static agents, dielectrics, glass frits, and insulators or so may be added depending on the needs.

Next, the green sheet formed with the internal electrode pattern is layered till it reaches the desired numbers of layers by releasing from the carrier sheet, thereby the green sheet multilayered body is obtained. Note that, at the first and the last layer, the outer layer green sheet without the internal electrode pattern is stacked.

Then, this green multilayered body is carried out with the final pressure applying. The pressure of the final pressure applying is preferably 10 to 200 MPa. Also, the heating temperature is preferably 40 to 100° C. Further, the multilayered body is cut into a predetermined size; thereby the green chip is obtained. The obtained green chip is carried out with the heat treatment (the solidification drying). The condition of the heat treatment is not particularly limited, however under the reduced atmosphere; it can be 140 to 180° C., and 2 to 10 hours.

Next, after the heat treatment, the green chip is carried out with the polishing. The polishing method is not particularly limited; and although it may be dry method or wet method, for example the wet barrel polishing can be used as well.

The binder removing treatment is carried out after the polishing. The condition of the binder removal treatment is not particularly limited, however for example, it may be under the air or nitrogen atmosphere, the temperature rising speed of 5 to 300° C./hour, the holding temperature of 200 to 400° C., and the temperature holding time of 0.5 to 20 hours.

Then, the firing of the green chip is carried out. The condition of the firing is not particularly limited, and for example, it can be under the reduced atmosphere, the temperature rising speed of 50 to 500° C., the holding temperature of 1000 to 1400° C., the temperature holding time of 0.5 to 8 hours, and the cooling temperature of 50 to 500° C. After the firing, by carrying out the annealing treatment and the polishing or so depending on the needs, the capacitor element 17 shown in FIG. 3 is obtained.

Finally, the first terminal electrode 14 and the second terminal electrode 16 are formed to the capacitor element 17. The terminal electrodes 14, 16 are produced for example by forming the base electrode by printing the terminal electrode paste, then forming the metal coating by plating the surface of the base electrode. Note that, the terminal electrode paste is prepared as similar to the above mentioned internal electrode layer paste; and the firing condition of the terminal electrode paste is for example under the mixed gas of wetted $N_2$ and $H_2$, at 600 to 800° C. for 10 minutes to 1 hour or so.

The Production Method of the First Metal Terminal Portion 20 and the Second Metal Portion 30

For the production of the first metal terminal portion 20 and the second metal terminal portion 30, first the substrate having a flat plate shape is prepared. The material of the substrate is not particularly limited as long as it is a metal material having conductivity, and for example the single metal or the alloy including at least one element selected from the group consisting of Ni, Cu, Sn, Fe, Zn, Al, Cr.

Next, the substrate is bended into L shape by the mechanical processing to form the approximate shape of the flat plate portion 22 and the mounting portion 24. Further, to the intermediate member of L shape, the coating layer 20b (refer to FIG. 4) is formed by the plating or so, thereby the metal terminal portions 20, 30 are obtained. During the coating layer forming treatment, by carrying out the resist treatment to the substrate surface of the mounting portion upper faces 24b, 34b, the coating layer 20b is prevented from forming on the mounting portion upper faces 24b, 34b, thereby the solder adhering prevention areas 25, 35 are formed at the mounting portion upper faces 24b, 34b. Thereby, the solder wettability of the mounting portion upper faces 24b, 34b and the mounting portion bottom faces 24a, 34a can be made different.

Note that, after forming the coating layer to the entire intermediate member, by removing only the coating layer formed on the mounting portion upper faces 24b, 34b using the laser releasing or so, it is also possible to form the solder adhering prevention areas 25, 35. Also, after forming the coating layer 20b to the substrate, it may be processed to bend into L shape.

The Assembling of the Ceramic Capacitor 10

The chip capacitor 12 obtained as such, and a pair of the metal terminal portions 20, 30 is prepared, and by joining the terminal electrodes 14, 16 of the chip capacitor 12 and the flat plate portions 22, 32 of the metal terminal portions 20, 30 by solder, the ceramic capacitor 10 is obtained.

The ceramic capacitor 10 according to the present embodiment, as shown in FIG. 2, is formed with the solder adhering prevention areas 25, 35 at the mounting portion upper faces 24b, 34b; hence the solder used for mounting the ceramic capacitor 10 to the board is prevented from excessively adhering to the mounting portion upper faces 24b, 34b. Therefore, as for the ceramic capacitor 10, the solder used for mounting it to the board excessively adheres to the part other than the mounting portion bottom faces 24a, 34a, hence the vibration generated at the ceramic capacitor 10 becomes easily transferred to the mounting board, thus the phenomena of the deterioration of the squealing noise together therewith can be effectively prevented.

Also, the metal terminal portions 20, 30 are constituted by the substrate 20a and the coating layer 20b, so that the coating layer 20b is not formed at the solder adhering prevention areas 25, 35, thereby the joining strength between the mounting portion bottom faces 24a, 34a and the solder can be suitably secured while preventing the excessive solder to the solder adhering prevention areas 25, 35. Also, by taking such constitution, the solder adhering prevention areas 25, 35 can be easily formed at the desired position.

The Second Embodiment

Figure 5:
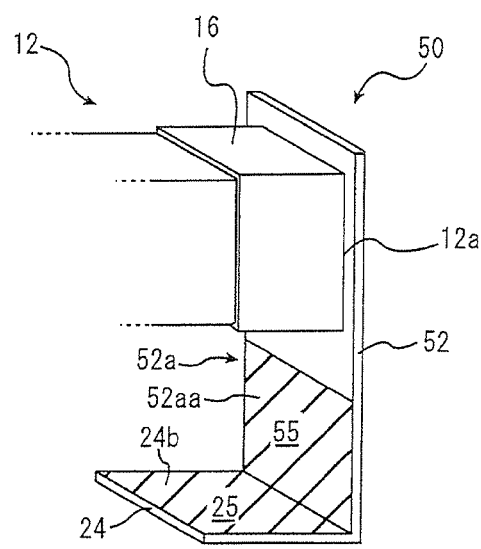
FIG. 5 is a partial perspective view of the ceramic electronic component according to the second embodiment of the present invention.

FIG. 5 is a partial perspective view of the ceramic capacitor according to the second embodiment of the present invention. The ceramic capacitor according to the second embodiment is the same as the ceramic capacitor 10 according to the first embodiment except that the flat plate portion 52 of the metal terminal portion 50 is different from the flat plate portions 22, 23 of the metal terminal portions 20, 30 according to the first embodiment; thus for the overlapping part, the description will be omitted.

As shown in FIG. 5, at the metal terminal portion 50, not only the mounting portion upper face 24b, but also at the first portion 52aa of the flat plate portion facing face 52a, the solder adhering prevention area 55 is formed. The first portion 52aa is a part of the flat plate facing face 52a, and it is a part at the side of the mounting portion 24 rather than the end face 12a of the chip capacitor 12, and in the embodiment shown in FIG. 5, it is connected to the end portion of the mounting portion upper face 24b.

The solder adhering prevention area 55 formed at the first portion 52aa does not form the coating layer at the first portion 52aa, thus the it can be formed by exposing the substrate surface, as similar to the solder adhering prevention area 25 formed at the mounting portion upper face 24b. The first portion 52aa is also the part which may have excessive adhering of the solder used for mounting the ceramic capacitor to the board, as similar to the mounting portion upper face 24b. Therefore, in addition to the mounting portion upper face 24b, the metal terminal 50 of which the solder adhering prevention area 55 is formed also at the first portion 52aa can further effectively prevent the squealing noise and the excessive solder adhering to the part other than the mounting portion bottom face 24a.

The Third Embodiment

Figure 6:
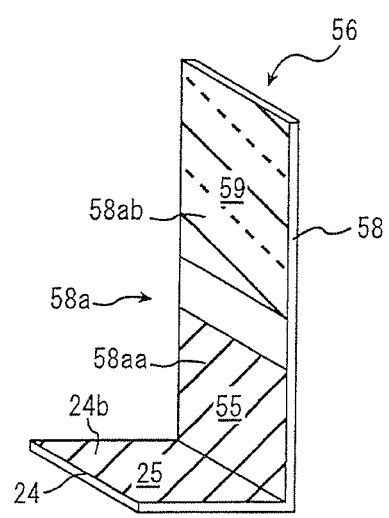
FIG. 6 is a schematic perspective view of the metal terminals used in the ceramic electronic component according to the third embodiment of the present invention.

FIG. 6 is a schematic perspective view of the metal terminal portion 56 included in the ceramic capacitor according to the third embodiment of the present invention. The ceramic capacitor according to the third embodiment is the same as the ceramic capacitor according to the second embodiment except that the flat plate portion 52 of the metal terminal portion 50 according to the second embodiment is different; hence the overlapping part will be omitted from describing.

As shown in FIG. 6, at the second portion 58ab of the flat plate portion facing face 58a of the metal terminal portion 56, the solder adhering area 59 having higher solder wettability than solder adhering prevention areas 25, 55 is formed. The second portion 58ab formed with the solder adhering area 59 is other part of the flat plate portion facing face 58a, and it is a portion facing the end face 12a of the chip capacitor 12. The second portion 58ab is positioned at the upper side than the first portion 58aa where the solder adhering prevention area 55 is formed.

The flat plate portion 58 of the metal terminal portion 56 is connected to the terminal electrode 14 of the chip capacitor 12 by the joining portion 42 constituted by the solder, as similar to the metal terminal portion 20 shown in FIG. 1. The joining portion 42 electrically and the physically connects the second portion 58ab shown in FIG. 2 and the terminal electrode 14. At the second portion 58ab, the solder adhering area 59 having high solder wettability is formed, thus the metal terminal portion 56 has high joining strength with the chip capacitor 12, and has suitable durability.

Note that, the second portion 58ab formed with the solder adhering area 59 may comprise the coating layer 20b which coats the substrate 20a as similar to the mounting portion bottom face 24a (refer to FIG. 4), and also it may comprise the coating layer different from the mounting portion bottom face 24a. Also, the ceramic capacitor according to the third embodiment exhibits the same effect as the ceramic capacitor according to the first and the second embodiment.

The Fourth Embodiment

Figure 7:
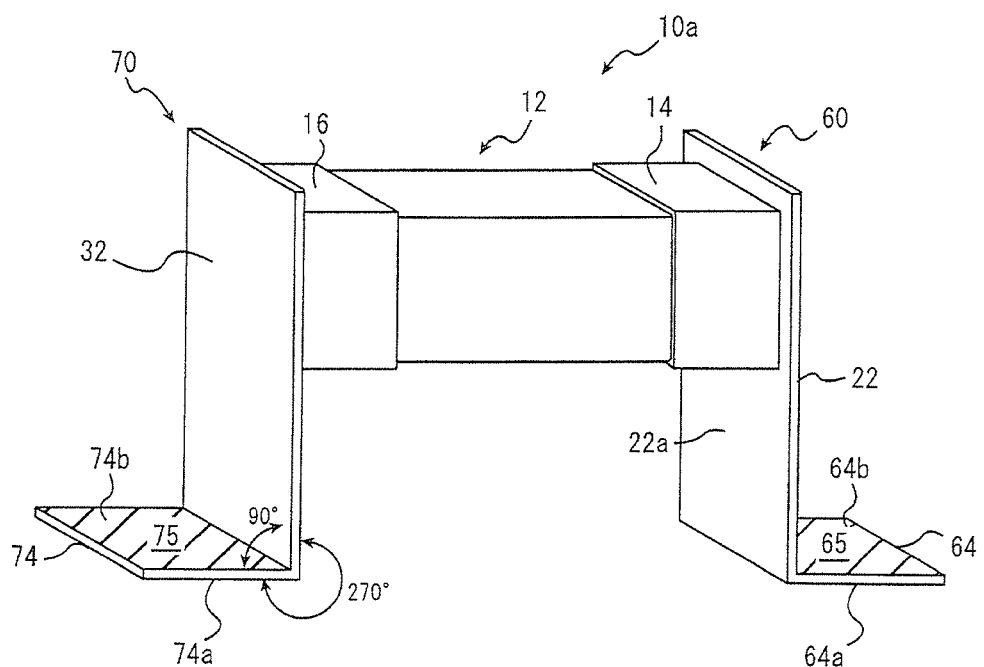
FIG. 7 is a schematic perspective view showing the ceramic electronic component according to the fourth embodiment of the present invention.

FIG. 7 is a schematic perspective view showing the ceramic capacitor 10a according to the fourth embodiment of the present invention. The ceramic capacitor 10a according to the fourth embodiment is the same as the ceramic capacitor 10 according to the first embodiment, except that the mounting portions 64, 74 of the first and the second metal terminal portions 60, 70 are different from the first and the second metal terminal portions 20, 30 shown in FIG. 2, hence the overlapping part will be omitted from describing.

As shown in FIG. 7, the mounting portion bottom face 64a of the first metal terminal portion 60 is connected to the flat plate portion facing face 22a of the flat plate portion 22. That is, the first metal terminal portion 60 is extending out from the flat plate portion 22, and comprises the mounting portion 64 which is bended into L shape towards the opposite side of the chip capacitor 12 side with respect to the flat plate portion 22.

The mounting portion 64 comprises the mounting portion bottom face 64a forming the angle of approximately 270 degrees with respect to the flat plate portion 22, and the mounting portion upper face 64b forming the angle of approximately 90 degrees with respect to the flat plate portion 22; and at the mounting portion upper face 64b, the solder adhering prevention area 65 is formed. The method for forming the solder adhering prevention area 65 at the first metal terminal portion 60 is the same as the first metal terminal portion 20 shown in FIG. 4 or so. Also, the second metal terminal portion 70 has the same constitution as the first metal terminal portion 60 except that it is symmetrically placed with respect to the first metal terminal portion 60. The second metal terminal portion 70 comprises the flat plate portion 32 and the mounting portion 74, and the mounting portion 74 comprises the mounting portion bottom face 74a and the mounting portion upper face 74b formed with the solder adhering prevention area 75.

In the ceramic capacitor 10a shown in FIG. 7, the mounting portions 64, 74 are formed by bending to the opposite side to the direct under of the chip capacitor 12 with respect to the flat plate portions 22, 32; thereby the space between the chip capacitor 12 and the mounting portion upper faces 64b, 74b is securely prevented from being embedded by the solder, and the sound squealing can be prevented. Also, the ceramic capacitor 10a has short length of the flat plates 22, 32, and even in case the height is made lower, the squealing noise can be effectively prevented.

The Fifth Embodiment

Figure 8:
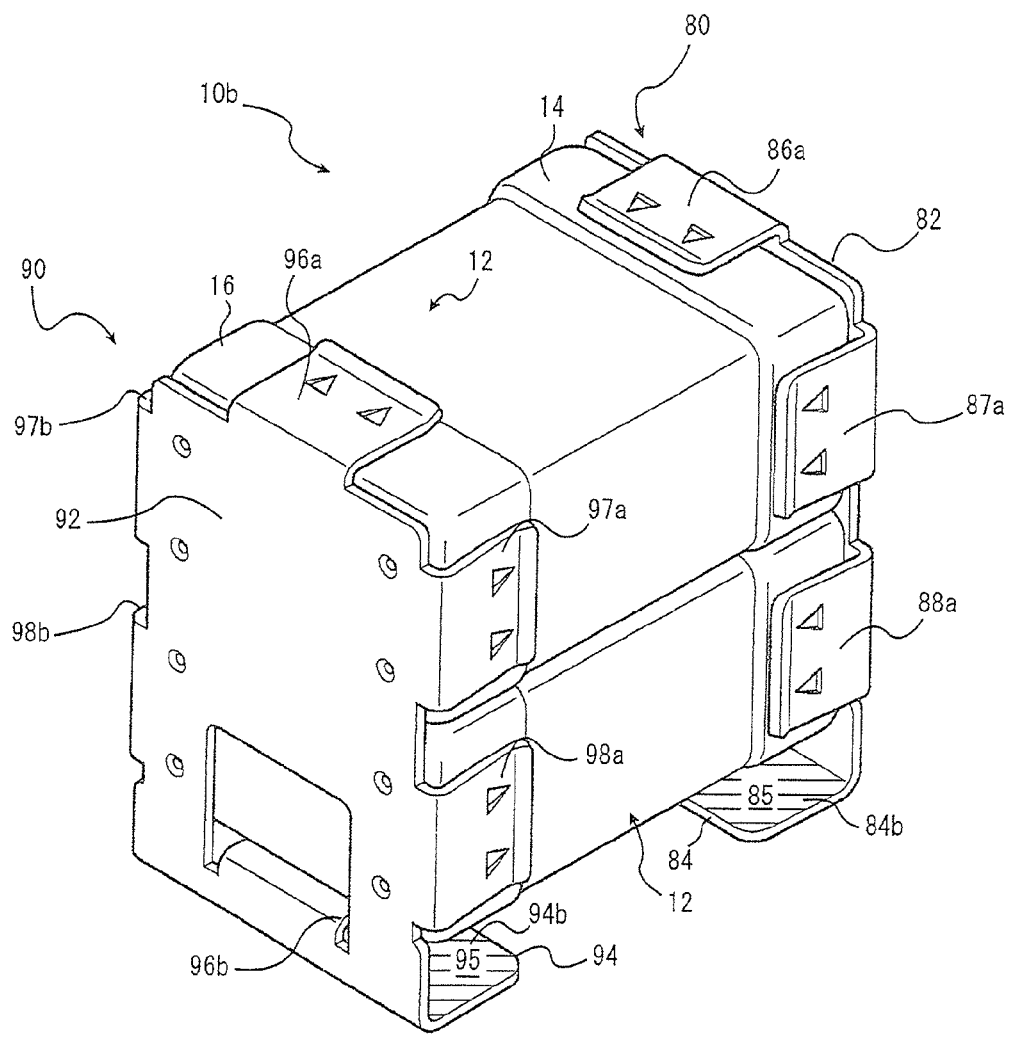
FIG. 8 is a schematic perspective view showing the ceramic electronic component according to the fifth embodiment of the present invention.

FIG. 8 is a schematic perspective view showing the ceramic capacitor 10b according to the fifth embodiment of the present invention. The ceramic capacitor 10b comprises two chip capacitors 12, the first metal terminal portion 80 and the second metal terminal portion 90. Note that, the number of the chip capacitors held by a pair of the metal terminal portions 80, 90 is not particularly limited, and this applies to the ceramic capacitor according to other embodiments as well. The joining portion connecting two chip capacitors and the first metal terminal portion 80, comprises three pairs of arm portions 86a, 87a, 88a.

In FIG. 8, among the arm portions having a pair, although one of the arm portions 86a, 87a, 88a is shown, other arm portions is placed at the back side of the chip capacitor 12. Each arm portions 86a, 87a, 88a is connected to the flat plate portion 82, and holds the terminal electrode 16 of the chip capacitor 12 in between. The second metal terminal portion 90 comprises three pairs of the arm portions 96a to 98a, 96b to 98b, as similar to the first metal terminal portion 80.

Also, the metal terminal portions 80, 90 comprises the mounting portions 84, 94, as similar to the metal terminal portions 20, 30 shown in FIG. 1, and at the mounting portion upper faces 84a, 94b of the mounting portions 84, 94, the solder adhering prevention areas 85, 95 are formed.

The joining portion of the ceramic capacitor 10b is not a solder, and it is constituted by the arm portions 86a to 88a, 96a to 98a, 96b to 98b, and the arm portions 86a to 88a or so hold the chip capacitor by the resilient force. Therefore, the capacitor 10b only needs to place the terminal electrodes 14, 16 between the arm portions 86a to 88a or so, thereby the metal terminal portions 80, 90 and the chip capacitor 12 can be easily assembled; hence the production is easy. Also, the ceramic capacitor 10b can prevent the fixing of the metal terminal portions 80, 90 and the chip capacitor 12 from coming off, caused by the heat transferred to the joining portion when mounting the ceramic capacitor 10b. Also, the ceramic capacitor 10b exhibits the same effect as the ceramic capacitor 10 according to the first embodiment.

The Sixth Embodiment

Figure 9:
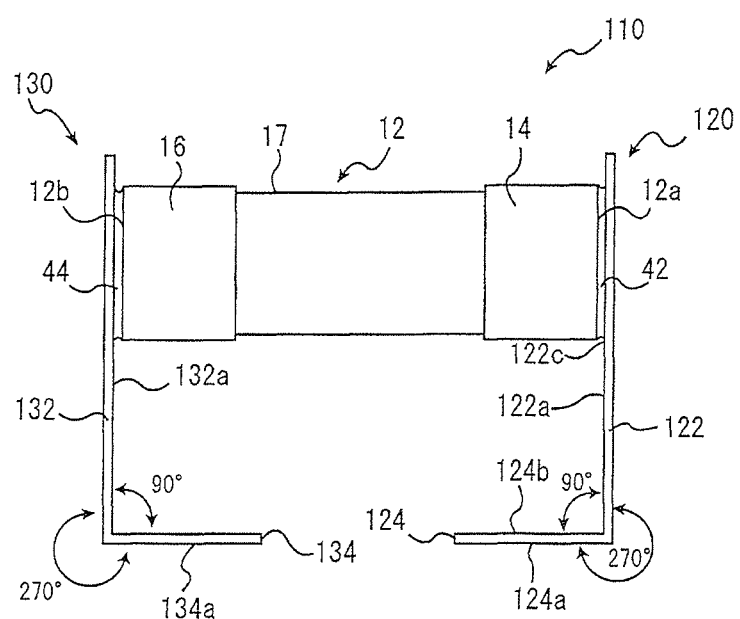
FIG. 9 is a schematic front view showing the ceramic electronic component according to the sixth embodiment of the present invention.

FIG. 9 is the schematic front view showing the ceramic capacitor 110 according to the sixth embodiment of the present invention. The ceramic capacitor 110 comprises the chip capacitor 12 as the chip component, and a pair of metal terminal portions 120, 130 connected to the ceramic capacitor 110 via the joining portions 42, 44. The ceramic capacitor 110 according to the sixth embodiment has the same constitution as the ceramic capacitor 10 according to the first embodiment except that the first and the second metal terminal portions 120, 130 are different from the first and second metal terminal portions 20 30, hence the overlapping part will be omitted from describing.

Figure 10:
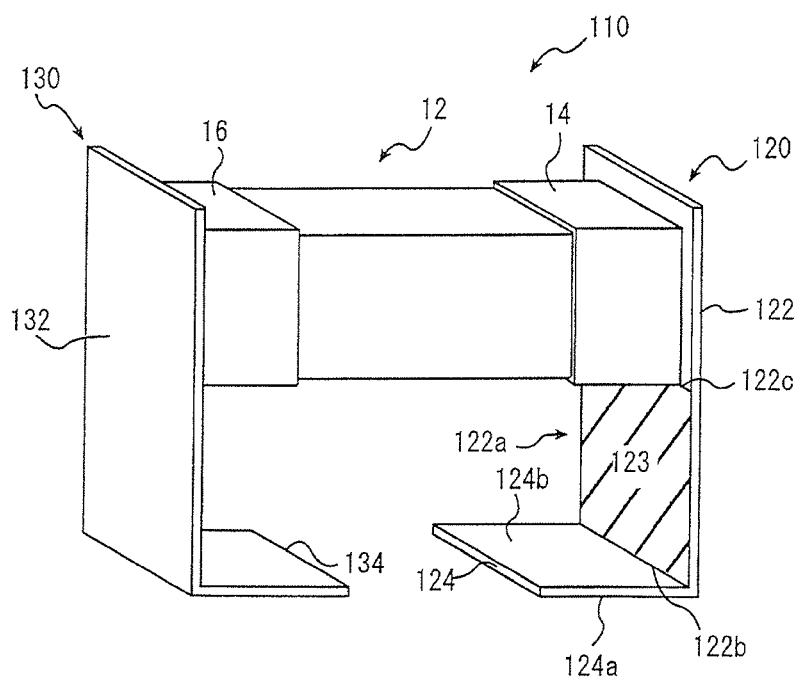
FIG. 10 is a schematic perspective view of the ceramic electronic component shown in FIG. 9.

As shown in FIG. 9 and FIG. 10, the metal terminals 120, 130 has a shape which the flat plate is bended into L shape. The first metal terminal portion 120 comprises the flat plate portion 122 having the flat plate portion facing face 122a placed so that it faces the end face 12a of the chip capacitor 12, and the mounting portion 124 connected to one end portion 122b of the flat plate portion 122 and extending approximately perpendicular to the flat plate portion 122. As shown in FIG. 9, the flat plate portion 122 is connected to the first terminal electrode 14 of the chip capacitor 12 via the joining portion 42.

The flat plate portion 122 of the first metal terminal portion 120 is extending parallel to the end face 12a of the chip capacitor 12, while the mounting portion 124 of the first metal terminal portion 120 extends approximately parallel to the side face of the chip capacitor 12. That is, the first metal terminal portion 120 extends out from the flat plate portion 122, and comprises the mounting portion 124 which is bended in L shape towards the same side of the chip capacitor 12. The mounting portion 124 comprises the mounting portion bottom face 124a forming an angle of approximately 270 degrees with respect to the flat plate portion, and the mounting portion upper face 124b forming an angle of approximately 90 degrees with respect to the flat plate portion 22.

The mounting portion bottom face 124a is a face facing the mounting face of the mounting board when providing the ceramic capacitor 110 to the mounting board, and when the mounting board side is considered as the down side, it is a face facing the down side in the ceramic capacitor 110. The solder used for mounting the ceramic capacitor 110 connects the mounting portion bottom face 124a and the mounting face of the board, and fixes the ceramic capacitor 110 to the board while ensuring the conductivity between the ceramic capacitor 110 and the board.

The mounting portion upper face 124b is a face at the opposite side of the mounting portion bottom face 124a of the mounting portion 124, and when the mounting board side is considered as the down side, it is a face facing the upper side of the ceramic capacitor 110. At the metal terminal portion 120 of the present embodiment, the mounting portion 124 is bended to the inner side (towards the side closer to other metal terminal portion 130); and the mounting portion upper face 124b faces the side face of the chip capacitor 12.

As shown by the sloped hatching line of the FIG. 10, at the flat plate portion 122 of the first metal terminal portion 120, the inner side prevention area 124 is formed. The inner side prevention area 123 has lower solder wettability than the mounting portion bottom face 124a, and it is a solder adhering prevention area where the solder is difficult to adhere wherein the solder is used for the mounting of the ceramic capacitor 110. The inner side prevention are 123 is formed, among the flat plate portion facing face, between one end portion 122b and the lower end portion 122c which is the connection part between the chip capacitor 12 (the position contacting with the lower end of the joining portion 42 (refer to FIG. 9)).

Figure 11:
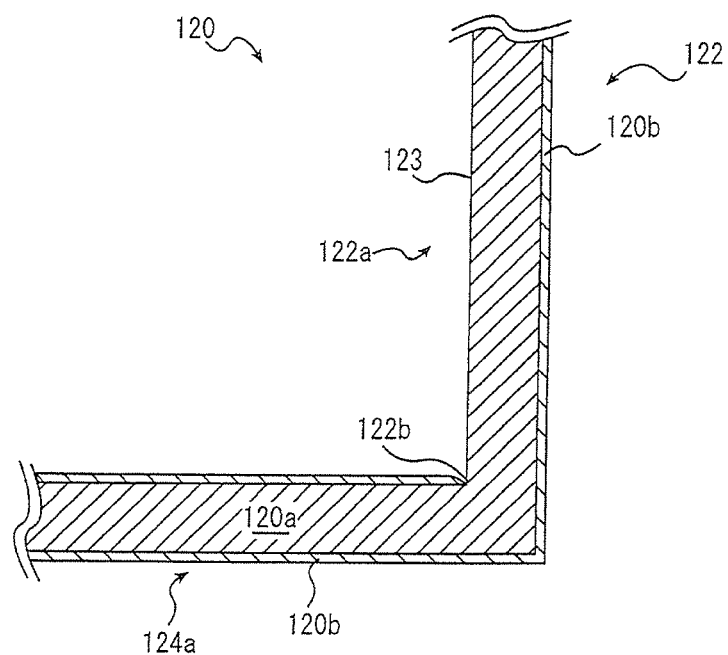
FIG. 11 is a schematic cross section showing the inner structure of the metal terminal portions included in the ceramic electronic component shown in FIG. 9.

FIG. 11 is an enlarged cross section showing the enlarged connection portion proximity between the mounting portion 124 and the flat plate portion 122 of the first metal terminal portion 120. The form of the solder adhering prevention area is not particularly limited; however due to the difference between the material of the substrate 120a and the coating layer 120b, the solder adhering prevention area like the inner side prevention area 123 can be formed. The first metal terminal portion 120 according to the present embodiment comprises the substrate 120a and the coating layer 120b coating at least part of the substrate surface which is the surface of the substrate 120. The coating layer 120b is constituted by the material having high solder wettability than the substrate 120a; and the inner side prevention area 123 of the flat plate portion facing face 122a which is not coated by the coating layer 120b and has the lower solder wettability than the mounting portion bottom face 124a of which the coating layer 120b is coating the substrate 120a.

The constituting element of the substrate 120a of the first metal terminal portion 120 is not particularly limited, however for example, it may be a single metal or alloy including at least one element selected from the group consisting of Ni, Cu, Sn, Fe, Zn, Al, Cr. Also, the constituting element of the coating layer 120b is not particularly limited, as long as the solder wettability is higher than the substrate 120a, and for example it can be a single metal or alloy including at least one element selected from the group consisting of Sn, Ni, Cu, and particularly preferably the main component is Sn.

Note that, in the example shown in FIG. 9 and FIG. 11, the inner side prevention area 123 which is the solder adhering prevention area is formed at a part of the flat plate portion facing face 122a in the flat plate portion 122; however the embodiment of the solder prevention area is not limited thereto, and the solder adhering prevention area having lower solder wettability than the mounting portion bottom face 124a may be formed at the flat plate portion outer face which faces the opposite direction of the flat plate portion facing face 122a. Also, the solder adhering prevention area may be formed to the both of the flat plate portion facing face 122a and the flat plate portion outer face. Further, for the embodiment of the solder adhering prevention area, it is not limited to the embodiment wherein the substrate surface is exposed, and for example, the embodiment of coating the flat plate portion facing face 122a by the coating layer which is different from the coating layer 120b coating the mounting portion bottom face 124a; or the embodiment of changing the surface roughness between the mounting portion bottom face 124a and the flat plate portion facing face 122a can be employed.

As shown in FIG. 9, the metal terminal portion 130 is connected to the flat plate portion 132 facing the end face 12b of the chip capacitor 12 and to one end portion of the flat plate portion 132; and comprises the mounting portion 134 extending approximately perpendicular with respect to the flat plate portion 132. At one part of the flat plate portion facing face of the second metal terminal portion 130, as similar to the flat plate portion facing face 122a of the first metal terminal portion 120, the inner side prevention area having lower solder wettability than the mounting portion bottom face 134 is formed.

The second metal terminal portion 130 has the same constitution as the above mentioned first metal terminal portion 120, except that it is placed symmetrically with respect to the first metal terminal portion 120; hence the detailed description will be omitted in here. Also, the joining portion 44 electrically and physically connecting the second terminal electrode 16 and the flat plate portion 132 (refer to FIG. 1) has the same constitution as the above mentioned joining portion 42.

Hereinafter, the production method of the ceramic capacitor 110 will be explained. Note that, for the production method of the chip capacitor 12, the overlapping description with the first embodiment will be omitted in here.

The production Method of the First Metal Terminal Portion 120 and the Second Metal Terminal Portion 130

For the production of the first metal terminal portion 120 and the second metal terminal portion 130, first, the substrate of flat plate shape is prepared. The material of the substrate 120a is not particularly limited as long as it is a metal having conductivity, and for example, the single metal or the alloy including at least one element selected from the group consisting of Ni, Cu, Sn, Fe, Zn, Al, Cr can be used.

Next, the substrate 120 is bended into L shape by mechanical processing, and the approximate shape of the flat plate portion 122 and the mounting portion 124 are formed. Further, to the intermediate member of L shape, the coating layer 120b is formed by plating or so (refer to FIG. 11). Finally, the substrate 120a is exposed by removing a part of the coating layer 120b formed at the flat plate portion facing face 122a by the laser releasing or so, thereby the inner side prevention area 123 is formed of which the solder scarcely adheres. Thereby, solder wettability can be made different between the mounting portion upper face 124b and the inner side prevention area 123 of the flat plate portion facing face 122a. Note that, the inner side prevention area 123 may be prevented from forming the coating layer 120b to the inner side prevention area 123 by carrying out the resist treatment to the surface part of the substrate 120a which corresponds to the flat plate portion facing face 122a. Also, the time of forming the mounting portion 124 by bend-processing the substrate 120a may be after forming the inner side prevention area 123 by laser releasing, and also it may be before carrying out the plating.

The Assembling of the Ceramic Capacitor 110

The chip capacitor 12 obtained as mentioned in above and a pair of the metal terminal portions 120, 130 are prepared, and the terminal electrodes 14, 16 of the chip capacitor 12 and the flat plate portions 122, 132 of the metal terminal portions 120, 130 are joined by the solder, thereby the ceramic capacitor 110 is obtained.

The ceramic capacitor 110 according to the present embodiment is formed with the inner side prevention area 123 which is the solder adhering prevention area, as shown in FIG. 9 and FIG. 10, and the solder used for mounting the ceramic capacitor 110 to the substrate can be prevented from excessively adhering to the flat plate portion 122. Therefore, as for the ceramic capacitor 110, the solder used for mounting it to the board excessively adheres to the part other than the mounting portion bottom face 124a, 134a; hence the vibration generated at the ceramic capacitor 12 becomes easily transferred to the mounting board, hence the phenomena of the deterioration of the squealing noise together therewith can be effectively prevented. Particularly, by forming the inner side prevention area 123 at the predetermined position of the flat plate portion facing face 122a, the problem of the squealing noise becoming worse which is caused by the flexible deformation of the metal terminal portions 120, 130 being compromised due to the solder used for mounting to the board connecting to the chip capacitor, can be effective prevented. Note that, not only to the flat plate portion facing face 122a, but also to the mounting portion upper face 124b, the solder prevention area having low solder wettability than the mounting portion bottom face 124a may be formed; thereby the solder is suppressed from adhering to other parts than the mounting portion bottom face 124a.

Also, the ceramic capacitor 110 has the mounting portions 124, 134 extending towards the inside from the flat plate portions 122, 132, and the mounting portions 124, 134 and the chip capacitor 12 are close to each other; however the solder can be prevented from connecting to the chip capacitor 12 from the inner side prevention area 123, thus both the prevention of the squealing noise and reduction of the mounting area can be accomplished. Also, in the ceramic capacitor 110, the inner side prevention are 123 can prevent the rising of the solder to the flat plate portion 122, thus it can be made lower by making the distance between the mounting portions 124, 134 and the chip capacitor 12 shorter.

Also, by constituting the metal terminal portions 120, 130 by substrate 120a and the coating layer 120b to form the condition wherein the coating layer 120b is not formed at the inner side prevention area 123, a suitable joining strength between the mounting portion bottom faces 124a, 134a and the solder can be ensured, while preventing the excessive adhering of the solder to the inner side prevention area 123.

The Seventh Embodiment

Figure 12:
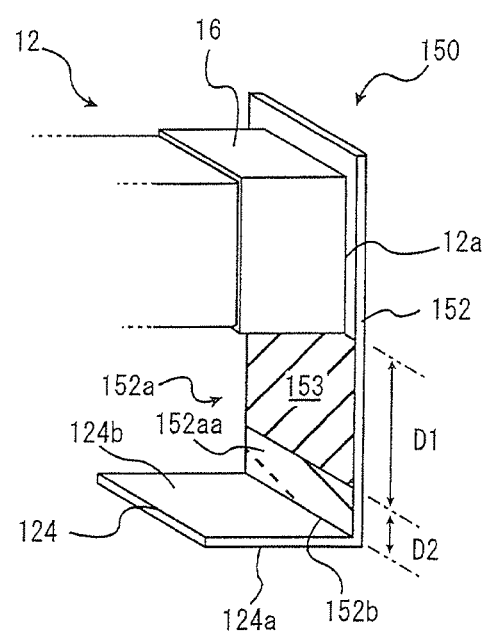
FIG. 12 is a partial perspective view of the ceramic electronic component according to the seventh embodiment of the present invention.

The inner side prevention area may be formed to one end portion 122b of the flat plate portion 122, or the inner side prevention area may be formed by taking a predetermined space from one end portion. FIG. 12 is a partial perspective view of the ceramic capacitor according to the present invention. The metal terminal portion 150 of the ceramic capacitor according to the seventh embodiment is the same as the ceramic capacitor 110 according to the sixth embodiment except that the embodiment of the flat plate portion facing face 152a is different from the flat plate portions 122, 132 of the metal terminal portions 120, 130 according to the first embodiment; hence the overlapping description will be omitted in here.

As shown in FIG. 12, at the flat plate portion facing face 152a of the metal terminal portion 150, the inner side prevention area 153 is formed by having a predetermined space from one end portion 152b of the flat plate portion 152. The space from one end portion 152b of the flat plate portion 152 to the inner side prevention area 153 is controlled depending on the size or so of the metal terminal portion 150, and it is preferably 0.05 to 0.5 mm. The inner side prevention area 153 has lower solder wettability than the mounting portion bottom face 124a, as similar to the inner side prevention area according to the sixth embodiment, and it is a solder adhering prevention area where solder scarcely adheres wherein the solder is used for mounting or so of the ceramic capacitor.

In the flat plate portion facing face 152a, in between the mounting portion 124 which connects to one end portion 152b with respect to the flat plate portion 152 and the inner side prevention area 153, the solder adhering area 152aa is formed. At the solder adhering area 152aa, the coating layer 120b is formed as similar to the mounting portion bottom face 124a (refer to FIG. 11), and the solder adhering area 152aa has higher solder wettability than the inner side prevention area 153. The length D1 of the height direction of the inner side prevention area 153, and the length D2 of the height direction of the solder adhering area 152aa may be controlled depending on the height or so of the ceramic capacitor; however for example, the length D1 of the height direction of the inner side prevention 153 is 0.1 to 1.0 mm, and the length D2 of the height direction of the solder adhering area 152aa is 0.05 to 0.5 mm; thereby the rising of the solder can be effective prevented. The ratio between the length D1 of the height direction of the inner side prevention area 153, and the length D2 of the height direction of the solder adhering area 152aa is not particularly limited; however D2/D1 may be 0.5 or so.

At the metal terminal portion 150, the inner side prevention area 153 which is the solder prevention area is formed by taking predetermined space from the mounting portion 124; thereby the solder adhering area 152aa formed in the middle holds the solder and functions as the buffer area which prevents the solder from rising higher. Therefore, the ceramic capacitor comprising the metal terminal portion 150 prevents the squealing noise and also effectively prevents the problem that the solder used for the mounting coming over the inner side prevention area 153 or connecting to the chip component by bypassing the inner side prevention area 153.

The Eighth Embodiment

Figure 13:
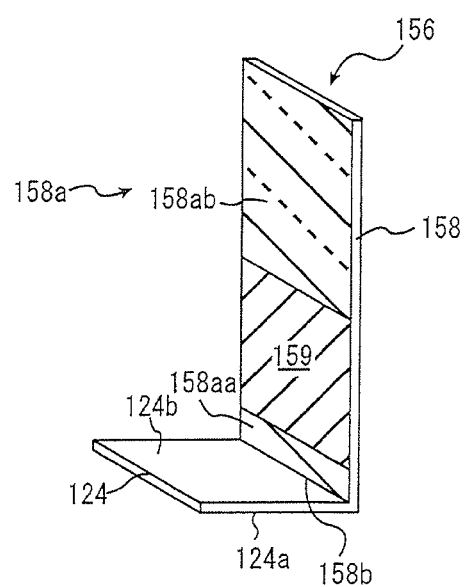
FIG. 13 is a schematic perspective view of the metal terminals used in the ceramic electronic component according to the eighth embodiment of the present invention.

FIG. 13 is a schematic perspective view of the metal terminal portion 156 included in the ceramic capacitor according to the eighth embodiment of the present invention. The ceramic capacitor according to the eighth embodiment is the same as the ceramic capacitor according to the seventh embodiment except that the flat plate portion 158 of the metal terminal portion 156 is different from the flat plate portion 152 of the metal terminal portion 150 according to the seventh embodiment; hence the overlapping description will be omitted in here.

As shown in FIG. 13, at one part of the flat plate portion facing face 158a of the metal terminal portion 156, the solder adhering areas 158aa, 1578ab having higher solder wettability than the inner side prevention area 159 as the solder adhering prevention area are formed. The solder adhering area 158aa is formed between one end portion 158b where the mounting portion 124 connects to the flat plate portion 158 and the inner side prevention area 159, as similar to the solder adhering area 152aa according to the seventh embodiment. Also, the solder adhering area 158ab is other end portion of the flat plate portion facing face 158a, and it is a part facing the end face 12a of the chip capacitor 12. The solder adhering area 158ab is position higher than the part where the inner side prevention area 159 is formed.

The flat plate portion 158 of the metal terminal portion 156 is connected to the terminal electrode 14 of the chip capacitor 12 by the joining portion 42 constituted by the solder, as similar to the metal terminal portion 120 shown in FIG. 9. The joining portion 42 electrically and physically connects the solder adhering area 158ab shown in FIG. 13 and the terminal electrode 14. At the solder adhering area 158ab, the coating area is formed as similar to the mounting portion bottom face 124a which has high solder wettability, thus the metal terminal portion 156 has high joining strength to the chip capacitor 12, thus has suitable durability.

Note that, the solder adhering area 158ab may comprise the coating layer 120b coating the substrate 120a as similar to the mounting portion bottom face 124a (refer to FIG. 11), and also it may comprise the coating layer different from the mounting portion bottom face 124a. Also, the ceramic capacitor according to the third embodiment exhibits the same effect as the ceramic capacitor according to the first and the second embodiments.

The Ninth Embodiment

Figure 14:
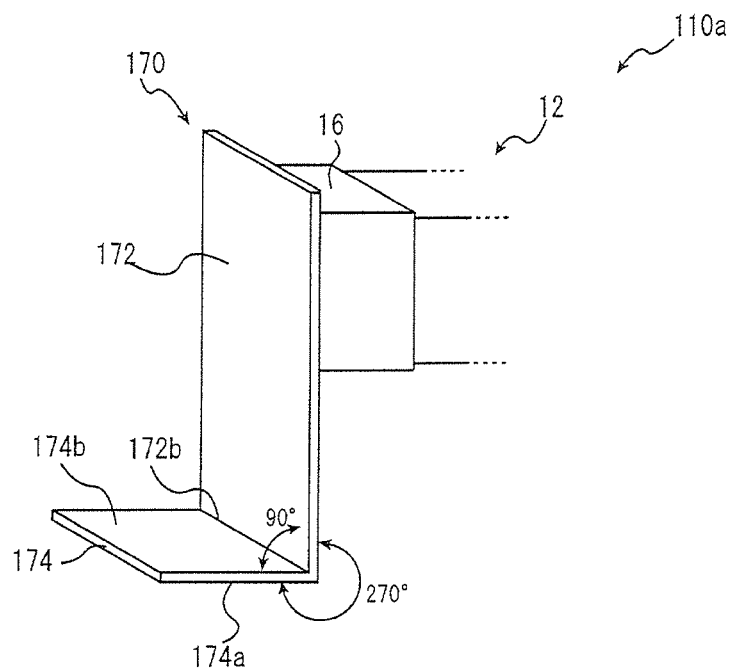
FIG. 14 is a perspective view of the important portion of the ceramic electronic component according to the ninth embodiment of the present invention.

FIG. 14 is a schematic perspective view of the ceramic capacitor 110a according to the ninth embodiment of the present invention. The ceramic capacitor 110a according to the ninth embodiment is the same as the ceramic capacitor 110 according to the sixth embodiment except that the embodiment of the mounting portion 174 of the first and the second metal terminal portions 170 is different from the first and the second metal terminal portions 120, 130 shown in FIG. 10; hence the overlapping description will be omitted in here.

As shown in FIG. 14, the mounting portion bottom face 174a of the second metal terminal portion 170 is connected to one end portion 172b of the flat plate portion 172. That is, the second metal terminal portion 170 extends to the outer side from the flat plate portion 172, and comprises the mounting portion 174 which is bended into L shape of the opposite side of the chip capacitor 12 side (the side of the other metal terminal).

The mounting portion 174 comprises the mounting portion bottom face 174a forming an angle of approximately 270 degrees to the flat plate portion 172, and the mounting portion upper face 174b forming an angle of approximately 90 degrees to the flat plate portion 172. The flat plate portion 172 is the same as the flat plate portions 122, 132 according to the sixth embodiment. Note that, other metal terminal (not shown in the figure) connected to the first end face 12a of the chip capacitor 12 via the joining portion 42 is placed symmetrical to the second metal terminal portion 170, and has the same shape as the second metal terminal portion 170.

The ceramic capacitor 110a shown in FIG. 14 can also prevent the solder used for mounting the ceramic capacitor 110a to the board to excessively adhere to the flat plate portion 172, and prevents the squealing noise.

The Tenth Embodiment

Figure 15:
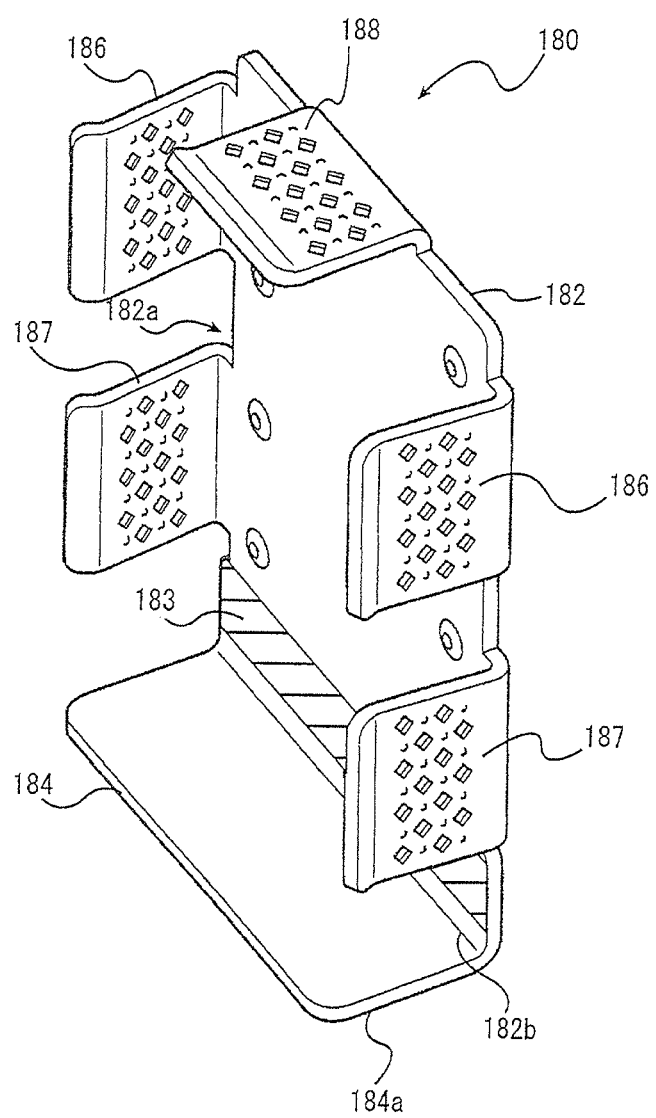
FIG. 15 is a schematic perspective view of the metal terminal used for the ceramic electronic component according to the tenth embodiment of the present invention.

FIG. 15 is a perspective view of the second metal terminal comprised in the ceramic capacitor according to the tenth embodiment of the present invention. The flat plate portion 182 of the second metal terminal portion 180 comprises the joining portion constituted by two pairs of arm portions 186, 187. The arm portions 186, 187 supports the chip capacitor 12 (refer to FIG. 3) by holding the terminal electrodes 14, 16 of the chip capacitor 12, while connecting the flat plate portion 182 and the terminal electrodes 14, 16. Also, at one end portion 182b of the flat plate portion 182, the mounting portion 184 is connected, and at other end portion, the stopper portion 188 which stops the chip capacitor 12 is connected.

Also, at the flat plate portion 182a of the metal terminal portion 180, the inner side prevention area 183 is formed which has lower solder wettability than the mounting portion bottom face 184a, as similar to the metal terminal portion 150 shown in FIG. 12.

The joining portion ceramic capacitor according to the tenth embodiment is constituted not only by the solder but also by the arm portions 186, 187; and the arm portions 186, 187 or so supports the chip capacitor by resilient force. Such ceramic capacitor allows the metal terminal portion 180 and the chip capacitor 12 to be easily assembled just by placing the terminal electrodes 14, 16 in between the arm portions 186, 187, thus the production is easy. Particularly, even in case the ceramic capacitor having plurality of chip capacitor by each arm portions 186, 187 supporting one chip capacitor, the production are easy. Further, the ceramic capacitor according to the tenth embodiment can prevent the fixing of the metal terminal portion 180 and the chip capacitor 12 from coming off caused by the heat transferring to the joining part when mounting the ceramic capacitor. Also, the ceramic capacitor according to the present embodiment exhibits the same effect as the ceramic capacitor 110 according to the sixth embodiment.

THE NUMERICAL REFERENCES 10, 10a, 10b, 110, 110a . . . Ceramic capacitor
12 . . . Chip Capacitor
12a, 12b . . . End faces
14, 16 . . . Terminal electrodes
20, 30, 50, 56, 70, 80, 120, 130, 150 . . . Metal terminal portions
22, 32, 52, 58, 72, 82, 122, 132, 152 . . . Flat plate portions
22a, 32a, 52a, 58a, 72a, 82a, 122a, 132a . . . Flat plate portion facing face
22b, 52b, 82b, 122b, 152b . . . One end portion
23, 53, 59, 83, 123, 153 . . . Inner side prevention area
24, 34, 74, 84, 124, 134 . . . Mounting portion 24a, 34a, 74a, 84a, 124a, 134a . . . Mounting portion lower face
24b, 74b, 124b, 174b . . . Mounting portion upper face
42, 44 . . . Joining portions

The invention claimed is:

1. A ceramic electronic component with metal terminals comprising a chip component formed with terminal electrodes at both ends, and
   a pair of metal terminals comprising a flat plate portion having a flat plate portion facing face provided so that it faces an end face of said chip component and connected to said terminal electrodes via a joining portion, and a mounting portion connected to one end portion of said flat plate portion and extending approximately perpendicular to said flat plate portion, wherein
   said mounting portion has a mounting portion bottom face forming an angle of approximately 270 degrees with respect to said flat plate portion, and a mounting portion upper face forming an angle of approximately 90 degrees with respect to said flat plate portion, and
   a solder adhering prevention area having lower wettability than said mounting portion bottom face is formed.

2. The ceramic electronic component with metal terminals as set forth in claim 1, wherein said solder adhering prevention area is formed at a first part of said flat plate portion facing face.

3. The ceramic electronic component with metal terminals as set forth in claim 1 wherein said metal terminals has a substrate and a coating layer which coats at least part of a substrate surface which is a surface of said substrate, and at said solder adhering prevention area, said substrate surface is exposed.

4. The ceramic electronic component with metal terminals as set forth in claim 3 wherein said substrate includes at least one element selected from the group consisting of Ni, Cu, Sn, Fe, Zn, Al, Cr, and said coating layer includes at least one element selected from the group consisting of Sn, Ni, Cu.

5. The ceramic electronic component with metal terminals as set forth in claim 1 wherein said mounting portion bottom face is connected to said flat plate portion facing face.

6. The ceramic electronic component with metal terminals as set forth in claim 1 wherein a solder adhering area having higher wettability than said solder adhering prevention area is formed at a second part of said flat plate portion facing face, said joining portion constituted by the solder is electrically and physically connected with said second part and said terminal electrodes.

7. The ceramic electronic component with metal terminals as set forth in claim 1 wherein said joining portion has at least one pair of fitting arm portion connected with said flat plate portion of said metal terminals and said one pair of the fitting arm portion holding said terminal electrodes of said chip in between.

8. The ceramic electronic component with metal terminals comprising a chip component formed with terminal electrodes at both ends, and
   a pair of metal terminals has a flat plate portion having a flat plate portion facing face provided so that it faces an end face of said chip component and connected to said terminal electrodes via a joining portion, and a mounting portion connected to one end portion of said flat plate portion and extending approximately perpendicular to said flat plate portion, wherein
   said mounting portion comprises a mounting portion bottom face forming an angle of approximately 270 degrees with respect to said flat plate portion, and a mounting portion upper face forming an angle of approximately 90 degrees with respect to said flat plate portion, and
   a solder adhering prevention area having lower wettability than said mounting portion bottom face is formed at said flat plate portion.

9. The ceramic electronic component with metal terminals as set forth in claim 8, wherein said solder adhering prevention area has an inner side prevention area formed in at least part of between said one end portion and the connection position with said chip component on said flat plate facing face.

10. The ceramic electronic component with metal terminals as set forth in claim 8 wherein said solder adhering prevention area is formed by taking a space of 0.05 to 0.5 mm from said one end portion.

11. The ceramic electronic component with metal terminals as set forth in claim 8 wherein said mounting portion upper face and said flat plate portion facing face forms an angle of approximately 90 degrees.

12. The ceramic electronic component with metal terminals as set forth in claim 8 wherein said chip component is a multilayer ceramic capacitor.

* * * * *